United States Patent
Poulain et al.

(10) Patent No.: US 12,265,281 B2
(45) Date of Patent: Apr. 1, 2025

(54) HEAD FREEDOM AREA OF AN OPTICAL LENS

(71) Applicant: Essilor International, Charenton-le-Pont (FR)

(72) Inventors: Isabelle Poulain, Charenton-le-Pont (FR); Guillaume Giraudet, Charenton-le-Pont (FR); Laurent Calixte, Charenton-le-Pont (FR); Alain Goulet, Charenton-le-Pont (FR); Sébastien Fricker, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 587 days.

(21) Appl. No.: 17/621,344

(22) PCT Filed: Jun. 25, 2020

(86) PCT No.: PCT/EP2020/067877
§ 371 (c)(1),
(2) Date: Dec. 21, 2021

(87) PCT Pub. No.: WO2020/260481
PCT Pub. Date: Dec. 30, 2020

(65) Prior Publication Data
US 2022/0373823 A1    Nov. 24, 2022

(30) Foreign Application Priority Data

Jun. 26, 2019    (EP) ..................................... 19305852

(51) Int. Cl.
*G02C 7/02*    (2006.01)
*G02C 7/06*    (2006.01)

(52) U.S. Cl.
CPC ............. *G02C 7/027* (2013.01); *G02C 7/066* (2013.01)

(58) Field of Classification Search
CPC ................................ G02C 7/027; G02C 7/066
(Continued)

(56) References Cited

U.S. PATENT DOCUMENTS

| | | |
|---|---|---|
| 2003/0107707 A1 | 6/2003 | Fisher et al. |
| 2010/0002191 A1 | 1/2010 | Drobe |

(Continued)

FOREIGN PATENT DOCUMENTS

| | | |
|---|---|---|
| EP | 2 695 578 A1 | 2/2014 |
| EP | 3 006 991 A1 | 4/2016 |

OTHER PUBLICATIONS

International Search Report and Written Opinion issued on Sep. 8, 2020 in PCT/EP2020/067877 filed on Jun. 25, 2020.

*Primary Examiner* — Tuyen Tra
(74) *Attorney, Agent, or Firm* — Oblon, McClelland, Maier & Neustadt, L.L.P.

(57) ABSTRACT

A device for determining a head freedom area of an optical lens adapted for a wearer looking at a specific point in a scene through the optical lens comprises at least one input adapted to obtain optical lens data representing the optical features of an optical lens, to obtain wearing data and fitting data representative of the wearing conditions and fitting parameters of the optical lens, and to obtain a specific threshold value for an optical performance criterion; and at least one processor configured for determining the head freedom area that corresponds to the head positions of the wearer that provide optical performances greater than or equal to the specific threshold value when the wearer is wearing the optical lens in given wearing conditions upon (Continued)

given fitting parameters and looking at the specific point in the scene through the optical lens.

17 Claims, 1 Drawing Sheet

(58) Field of Classification Search
USPC .................. 351/41, 159.01, 159.73, 159.74
See application file for complete search history.

(56) References Cited

U.S. PATENT DOCUMENTS

| | | |
|---|---|---|
| 2012/0092614 A1 | 4/2012 | Drobe et al. |
| 2015/0103312 A1 | 4/2015 | Paille et al. |
| 2015/0212342 A1 | 7/2015 | Giraudet et al. |
| 2016/0274383 A1 | 9/2016 | Petignaud et al. |
| 2017/0299888 A1 | 10/2017 | Tranvouez et al. |
| 2018/0017815 A1* | 1/2018 | Chumbley ............ G02C 7/027 |
| 2018/0299696 A1 | 10/2018 | Heslouis et al. |
| 2024/0242441 A1* | 7/2024 | Aleem .................. G01P 13/00 |

* cited by examiner

HEAD FREEDOM AREA OF AN OPTICAL LENS

TECHNICAL FIELD

The disclosure relates to a device and the associated methods for evaluating the performances and optimizing an optical lens. In particular, the disclosure relates to a device and method for determining a head freedom area of an optical lens adapted for a wearer looking at a specific point in a scene through the optical lens.

Furthermore, the disclosure relates to a computer program product comprising one of more stored sequences of instruction that is accessible to a processor.

BACKGROUND

Ergodynamics considers that, for a given task, one cannot limit oneself to a single posture, however good it may be. In other words, there is no ideal posture or gaze direction for a given visual task. The ideal posture is: "the next one" as the regular change of posture during a task allows to prevent muscle tension and reduces the stresses on the body.

Yet, the traditional optimization process of optical lenses doesn't take into account this dynamic need of head posture flexibility.

Traditionally, for a given object point, the optimization process considers only one gaze direction through the lens. Therefore, a given task has to be done with a fine-tuned head posture control to find the good zone of vision and the tolerance in terms of head movements for this task is limited, increasing the level of muscle stress for example in the neck and shoulders.

Traditionally, according to the object distance, optical criteria are computed for each gaze direction and/or object distance, such as for example the mean power, resulting astigmatism, high order aberrations, prismatic deviations or visual acuity and the optical lenses are optimized to improve at least one of these criteria.

However, in traditional optimization processes, each object is associated to a unique gaze direction and thus to a unique point in the lenses.

Taking into account more than one gaze direction and thus more than one point in the lens when optimizing an optical lens would allow considering an enlarged range of posture and therefore head positions the user can adopt with the optical lens.

Therefore, there is a need to evaluate the performances of the optical lens for different head postures and different gaze directions associated with a single object.

SUMMARY

To this end, the disclosure proposes a device for determining a head freedom area of an optical lens adapted for a wearer looking at a specific point in a scene through the optical lens, wherein it comprises:
  at least one input adapted to:
    obtaining optical lens data representing the optical features of an optical lens,
    obtaining wearing data and fitting data representative of the wearing conditions and fitting parameters of the optical lens,
    obtaining a specific threshold value for an optical performance criterion;
  at least one processor configured for:
    determining the head freedom area that corresponds to the head positions of the wearer that provide optical performances greater than or equal to the specific threshold value when the wearer is wearing the optical lens in given wearing conditions upon given fitting parameters and looking at the specific point in the scene through the optical lens.

Advantageously, determining the head freedom area of an optical lens wearer allows evaluating if a lens is adapted for the wearer. In other words, the present disclosure may serve as a new tool to evaluate and/or optimize the performance for a user of an optical lens or equipment.

Moreover, determining the head freedom area of multiple optical lenses allows selecting the most adapted one for a user by comparing them to each other.

According to further embodiments which can be considered alone or in combination:
  the optical lens data comprise at least data representative of the geometry of the front and back surfaces of the optical lens, the relative position of said front and back surfaces and the index of refraction of the optical lens; and/or
  the optical performance criterion comprises an acuity performance criterion; and/or
  the optical performance criterion comprises an optical power criterion; and/or
  the optical performance criterion comprises an unwanted astigmatism criterion; and/or
  the head positions of the wearer are defined by at least a head rotation angle; and/or
  the head positions of the wearer are determined around a head position of reference; and/or
  the head position of reference corresponds to the head position of the wearer that requires the lower effort when looking at the specific point in the scene through the optical lens; and/or
  the head freedom area corresponds to the head positions that further require an effort for the wearer lower than or equal to an effort threshold value when the wearer is wearing the optical lens in the given wearing conditions upon given fitting parameters and looking at the specific point in the scene through the optical lens; and/or
  the wearing conditions are standard wearing conditions; and/or
  the wearing conditions are customized wearing conditions; and/or
  the optical lens is an ophthalmic lens; and/or
  at least one input is adapted to obtain different specific threshold and the at least one processor is configured to determine the head freedom area for different visual tasks requiring the wearer to look at different specific points in the scene; and/or
  the different specific points are all at the same distance; and/or
  the different specific points are at at least two different distances; and/or
  at least part of the different specific points is at a distance greater than or equal to 4 m; and/or
  at least part of the different specific points is at a distance smaller than or equal to 2 m and greater than or equal to 0.6 m; and/or
  at least part of the different specific points is at a distance smaller than or equal to 0.5 m.

The disclosure further relates to a device for determining a binocular head freedom area of a pair of optical lenses adapted for a wearer looking at a specific point in a scene through the pair of optical lenses, wherein it comprises:

at least one input adapted to:
obtaining optical lens data representing the optical features of each optical lens,
obtaining wearing data and fitting data representative of the wearing conditions and fitting parameters of each optical lens,
obtaining a specific threshold value for a binocular optical performance criterion;

at least one processor configured for:
determining the binocular head freedom area that corresponds to the head positions of the wearer that provide binocular optical performances greater than or equal to the specific threshold value when the wearer is wearing the pair of optical lenses in the given wearing conditions upon the given fitting parameters and looking at the specific point in the scene through the pair optical lens.

Advantageously, determining the binocular head freedom area of a pair of optical lenses allows evaluating if an optical equipment comprising the pair of optical lenses is adapted for a wearer.

According to further embodiments which can be considered alone or in combination:

the binocular optical performance criterion comprises binocular acuity and/or difference of prismatic deviations; and/or the at least one processor is further configured for determining display data to be sent to a terminal so as to provide a graphical representation of the a head freedom area; and/or The disclosure further relates to a method implemented by computer means for determining an optical lens adapted for a wearer, the method comprising determining the optical features of the optical lens considering the head freedom area of the wearer looking at a specific point in a scene through the optical lens.

The disclosure further relates to a computer program product comprising one or more stored sequences of instructions that are accessible to a processor and which, when executed by the processor, causes the processor to carry out the steps of:

obtaining optical lens data representing the optical features of an optical lens,
obtaining wearing data and fitting data representative of the wearing conditions and fitting parameters of the optical lens,
obtaining a specific threshold value for an optical performance criterion;
determining the head freedom area that corresponds to the head positions of a wearer that provide optical performances greater than or equal to the specific threshold value when the wearer is wearing the optical lens in given wearing conditions upon given fitting parameters and looking at a specific point in the scene through the optical lens.

The disclosure further relates to a method implemented by computer means for determining a head freedom area of an optical lens adapted for a wearer looking at a specific point in a scene through the optical lens, wherein the method comprises at least the steps of:

obtaining optical lens data representing the optical features of the optical lens,
obtaining wearing data and fitting data representative of the wearing conditions and fitting parameters of the optical lens,
obtaining a specific threshold value for an optical performance criterion;
determining the head freedom area that corresponds to the head positions of the wearer that provide optical performances greater than or equal to the specific threshold value when the wearer is wearing the optical lens in given wearing conditions upon given fitting parameters and looking at the specific point in the scene through the optical lens The disclosure further relates to a computer-readable storage medium having a program recorded thereon, wherein the program makes the computer execute a method according to the disclosure.

BRIEF DESCRIPTION OF THE DRAWINGS

Embodiments of the disclosure will now be described, by way of example only, and with reference to the following drawings in which.

Figure 1:
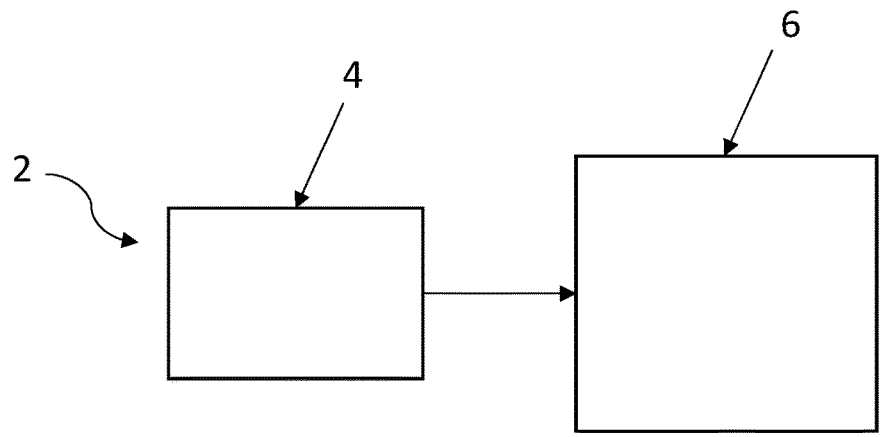
FIG. 1 illustrates a device according to an embodiment of the disclosure.
Figure 2:
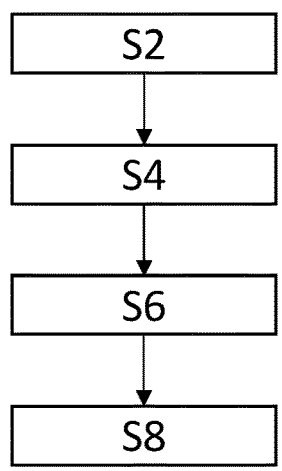
FIG. 2 illustrates a chart-flow embodiment of the method for determining a head freedom area of an optical lens.
Figure 3:
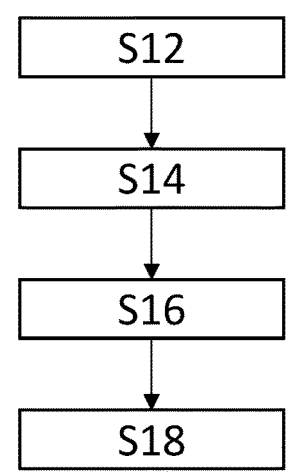
FIG. 3 illustrates a chart-flow embodiment of the method for determining a binocular head freedom area of a pair of optical lenses.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION

The disclosure relates to a device for determining a head freedom area of an optical lens adapted for a wearer looking at a specific point in a scene though the optical lens.

In the context of the present disclosure, the term head freedom area refers to a range of head positions the wearer of an optical lens can adopt without losing optical performance beyond a certain predefined value when looking at a specific point through the optical lens. For specific vision conditions with a specific optical lens, the head freedom area may be represented as a specific three-dimensional space representing all the positions of the head of the wearer fixing a certain point while conserving an acceptable visual acuity.

The Inventors have observed that an enlarged head freedom area provides multiple benefits. First, when there is a change in viewing distance, it allows the wearer to find the good zone of visions without relying on high precision gaze movement and head positioning. Second, when the wearer is performing a visual task at a given distance, an enlarged head freedom area provides head movement tolerance which allows the wearer to perform the task with a lesser fine-tuned head posture control, thereby decreasing the level of muscle stress, for example in the neck and shoulders.

The device 2 for determining a head freedom area of an optical lens according to the disclosure comprises at least one input 4. The at least one input 4 corresponds to an element of the device 2 adapted to obtain information and to communicate the obtained information to other elements of the device such as a processor 6. In the sense of the disclosure, the term "obtaining" encompasses the terms "receiving" and "retrieving".

The at least one input 4 is adapted to obtain optical lens data. The optical lens data represent the optical features of an optical lens.

According to an embodiment of the disclosure, the optical data may comprise at least data representative of the geometry of the front and back surfaces of the optical lens, the relative position of said front and back surfaces and the index of refraction of the optical lens. Usually, the back surface of the optical lens refers to the surface of the lens facing the eye of the person wearing the optical lens and the front surface refers to the surface opposed to the surface of the optical lens facing the eye of the person wearing the optical lens.

The at least one input 4 is adapted to obtain wearing data representative of the wearing conditions and to obtain fitting data representative of the fitting parameters of the optical lens.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm. The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearing condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

According to another embodiment of the disclosure, the wearing conditions may be customized wearing conditions that are measured on the wearer when the wearer wears a spectacle frame he/she chose.

The fitting parameters of the optical lens are to be understood as parameters related to the position of the frame on which the optical lens is mounted with respect to the face of the wearer he/she wears the frame.

The at least one input 4 is adapted to obtain a threshold value for an optical performance criterion.

The optical performance criterion may comprise an acuity performance criterion.

The acuity performance criterion may correspond to an acuity loss value which corresponds to the maximum value of acuity loss acceptable for a given distance.

The acuity loss, referred as ACU_P, is defined as a function of the relative acuity at a given point of the object space ($\alpha$, $\beta$, ProxO), according to following equation:

$$ACU\_P(\alpha,\beta,ProxO) = -\log(AC\ \%\_P(\alpha,\beta,ProxO)/100)$$

where "log" is the logarithm in base 10.

The relative acuity, referred as ACU_P, is defined as the result of a function of the mean refractive power error, PE_P, and of the resulting astigmatism, ASR, according to an acuity model, at a given point of the object space ($\alpha$, $\beta$, ProxO).

The mean refractive power error, referred as PE_P, is defined as the mean refractive power difference between the actual addition brought by the lens and the proximity, at a given point of the object space ($\alpha,\beta$,ProxO), according to following equation:

$$PE\_P(\alpha,\beta,ProxO) = PPO(\alpha,\beta,ProxO) - (PPO(FV) - ProxFVp) - ProxO$$

where PPO(FV) is the mean refractive power of the prescription of the wearer according to the far-vision gaze direction, for an object located at a distance corresponding to ProxFVp.

The resulting astigmatism, referred as ASR, is the difference between the prescribed astigmatism (wearer astigmatism) and the lens-generated astigmatism.

The optical performance criterion may comprise an optical power criterion.

The optical power criterion relates to the optical power PPO which is the sum of the image proximity and the object proximity.

The object proximity ProxO is defined for a point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere. For a real lens, the object proximity can be considered as the inverse of the distance between the object point and the front surface of the lens, on the corresponding light ray.

For the same gaze direction ($\alpha,\beta$), the image of a point M having a given object proximity is formed between two points S and T which correspond respectively to minimal and maximal focal distances (which would be sagittal and tangential focal distances). The quantity Prox1 is called image proximity of the point M:

$$ProxI = \frac{1}{2}\left(\frac{1}{JT} + \frac{1}{JS}\right)$$

The optical performance criterion may comprise an unwanted astigmatism criterion.

The unwanted astigmatism criterion relates to the resulting astigmatism ASR defined for every gaze direction through the optical lens as the difference between the actual astigmatism value AST for this gaze direction and the prescribed astigmatism for the same optical lens. The resulting astigmatism ASR more precisely corresponds to a module of the vectorial difference between actual (AST, AXE) and prescription data (CYLp, AXISp).

The actual astigmatism AST is defined for every gaze direction and for a given object proximity as:

$$AST = \left| \frac{1}{JT} - \frac{1}{JS} \right|$$

The device 2 for determining a head freedom area of an optical lens according to the disclosure further comprises at least one processor 6. The at least one processor 6 is able to communicate with the at least one input.

The at least one processor 6 is configured for determining the head freedom area of an optical lens adapted for a wearer.

The head freedom area corresponds to the head positions of the wearer that provide optical performances greater than or equal to a specific threshold value when the wearer is wearing the optical lens in given wearing conditions upon given fitting parameters and looking at a specific point in the scene through the optical lens.

For a specific point in the scene, we may define a plurality of head positions of the wearer, each head position of the wearer being associated with a gaze direction of the wearer looking at said specific point in the scene. The optical performance is determined for each of the plurality of positions of the head of the wearer associated with a gaze direction while the wearer is looking at the specific point in the scene through the optical lens. The determined optical performance is then compared to the specific threshold value for said optical performance criterion. Each position of the head of the wearer fixing the specific point in the scene through the optical lens for which the determined optical performance is greater than or equal to the specific threshold value define the head freedom area.

For example, for each head position, the eye gaze angles are calculated from ray-tracing in order to fix the fixation point. Then, the optical performance criterion, for instance the acuity loss is evaluated and checked whether it is above acuity threshold. The head positions where acuity condition is fulfilled describe an area, so-called "head freedom area". The larger the head freedom area is, the freer the wearer is to move its head to view the fixation point with an acuity above threshold.

Advantageously, determining the head freedom area of an optical lens wearer allows evaluating if a lens is adapted for the wearer. In other words, the device according to the disclosure serves as new tool to evaluate the performances and the comfort of utilization of an optical lens worn by the wearer.

The position of the specific point in the scene may be defined using a model of the scene.

The model Ms of the scene may comprise a main reference frame, which is the general reference frame of the environment considered in the scene. The model Ms of the scene may further comprise one or more objects, each object having its own reference frame. The shape of an object may comprise geometric forms defined in the reference frame of the object, such as points, lines, rectangles, spheres, parallelepipeds, triangular meshes and/or quad meshes. The position of a specific point in the scene or of an object in the scene may be defined with respect to the main reference frame.

For example, the position of an object with respect to the main reference frame may be described by using a rotation matrix R and a translation matrix T. For example, the rotation matrix R is a 3×3 matrix and the translation matrix T is a 3×1 vector.

The coordinates of a given point in the reference frame of an object are given by a triplet Po and the coordinates of that point in the main reference frame are given by a triplet Pm. The transformation from the main reference frame to the reference frame of the object is given by (R, T) such that Po=R×Pm+T. Each object may thus be defined by its geometry and the transformation (R, T).

The position of the head of the wearer fixing the specific point in the scene may be defined by at least a head rotation angle.

Regarding the movement and position of the head, several models of head rotation are known, for example from the article by M. Kunin, Y. Osaki, B. Cohen and T. Raphan entitled "Rotation Axes of the Head During Positioning, Head Shaking, and Locomotion", in J. Neurophysiol. 98, pages 3095-3108, 2007.

The reference frame of the trunk may be defined as follows. The origin of the trunk reference frame is located at the midpoint between the left shoulder point and the right shoulder point. The X-axis of the trunk reference frame passes through the shoulder points and points toward the right side of the wearer in a direction corresponding to the horizontal direction. The Z-axis points toward the back of the wearer in the horizontal direction and is perpendicular to the line joining the two shoulder points. The Y-axis points upwards, in a direction corresponding to the vertical direction and is orthogonal to the X-axis and to the Z-axis.

For example, the head movement may be described by three angles theta, phi and rho, corresponding respectively to head pitch, yaw and roll. For example, the transformation matrix from the reference frame of the trunk to the reference frame of the head may be the combination of a rotation about an X-axis of an angle equal to k×theta, a translation about an Y-axis, orthogonal to the X-axis, of a distance equal to the trunk to head distance, a rotation about a Z-axis, orthogonal to the X-axis and to the Y-axis, of an angle equal to rho, a rotation about the X-axis of an angle equal to (1−k)×theta and a rotation about the Y-axis of an angle equal to phi, where k=0.22.

The eye movement may for example be described by two angles corresponding to eye gaze directions: lowering and azimuth. Optionally, the torsion of the eye may also be taken into account. For example, the eye movement may be described according to Listing's law.

The head position of the wearer may be determined around a head position of reference.

For example, the head reference position may correspond to the head position of the wearer that requires the lower effort when looking at the specific point in the scene through the optical lens.

The effort may comprise a head posture effort, which is the physiological effort made by the wearer for having such head posture. A head posture effort function may compute the effort made by the wearer to maintain a position of the head. Typically, the posture effort is minimum for a head lowering, head azimuth and head torsion angles of zero degree.

By way of non-limiting example, the head posture effort may be defined as follows. Referring to the above-mentioned head rotation angles theta, phi and rho, corresponding respectively to head pitch, yaw and roll, theta is the rotation angle of the head about the X-axis in degrees, phi is the rotation angle of the head about the Y-axis in degrees, rho is the rotation angle about the Z-axis in degrees, all rotations being defined with respect to the trunk, and HeadPostureEffort is the head posture effort in arbitrary units.

$$HeadPostureEffort(theta,phi,rho) = ex + ey + ez,$$

where $ex=(theta/80)^2$; $ey=(phi/80)^2$; and $ez=(rho/45)^2$

The effort may for example comprise, instead of the head posture effort or in addition to the head posture effort, a gaze effort of at least one eye, which is the physiological effort made by the model Mw of the wearer for having such a gaze direction. A gaze effort function may compute, for at least one eye, the effort made by the wearer to maintain a position as a function of the gaze direction. Typically, the gaze effort is minimum for a gaze lowering angle of about 15 degrees and a gaze azimuth angle of zero degree.

By way of non-limiting example, the gaze effort of one eye may be defined as follows: alpha is the eye's gaze lowering angle in degrees, beta is the eye's gaze azimuth angle in degrees and GazeEffort is the eye's gaze effort in arbitrary units.

$$GazeEffort(alpha,beta) = 4.7398 - 46.0510a + 170.4699b^2 + 146.0116a^2 + 9.9626a^3 + 77.7729b^2a - 0.7459b^4 + 85.2274a^4 - 21.3346b^2a^2$$

where $a=alpha/100$ and $b=beta/100$

The head reference position may correspond to the head position of the wearer that minimizes among others the acuity loss, the head postural effort and the gaze effort of a wearer for a specific fixation point. Such head reference position may be expressed as the head position that minimizes the following cost function:

$$Cost(posture) = Cost(theta,phi,rho) = gaze\_effort\_left + gaze\_effort\_right + head\_posture\_effort + acuity\_penalty$$

where gaze_effort_left=GazeEffort(alpha_left, beta_left) corresponds to the gaze effort for the left eye; and gaze_effort_right=GazeEffort(alpha_right, beta_right) corresponds to the gaze effort for the right eye;
where acuity_penalty=max(acuity_target−acuity_value, 0), where max(acuity_target−acuity_value, 0) is the highest value between 0 and the difference between the visual acuity target value and the actual visual acuity value with which the point is seen.

Advantageously, determining the positions of the head of the wearer fixing a specific point in the scene around a head position of reference allows reducing the calculation time to determine the head freedom area of the optical lens.

According to an embodiment of the disclosure, the head freedom area may correspond to the head positions that further require an effort for the wearer lower than or equal to an effort threshold value when the wearer is wearing the optical lens in the given wearing conditions upon given fitting parameters and looking at the specific point in the scene through the optical lens.

The at least one input may further be adapted to obtain different specific threshold values for an optical performance criterion. Each of the threshold values for an optical performance criterion is specific to a specific point in the scene that is looked at by the wearer through the optical lens.

The at least one input may further be adapted to obtain different specific threshold values for different optical performance criteria. Each of the threshold values for the optical performance criterion may be specific to single specific point in the scene that is looked at by the wearer through the optical lens. Alternatively, each of the threshold values for the optical performance criterion may be specific to different specific points in the scene that is looked at by the wearer through the optical lens.

The at least one processor may further be configured to determine a head freedom area for different visual tasks requiring the wearer to look at different specific points in the scene.

For example, if we consider the task of reading at the center of the Smartphone object, an acuity loss threshold can be fixed to 0.1 Log MAR to able to read text on it.

According to an embodiment of the disclosure, all the different specific points are all at the same distance.

Alternatively, the different specific points may be at at least two different distances.

For example, at least part of the different specific points is at a distance greater than or equal to 4 m.

For example, at least part of the different specific points is at a distance smaller than or equal to 2 m and greater than or equal to 0.6 m.

For example, at least part of the different specific points is at a distance smaller than or equal to 0.5 m.

The disclosure further relates to a device for determining a binocular head freedom area of a pair optical lenses adapted for a wearer looking at a specific point in a scene though the pair of optical lenses.

The device for determining a head freedom area of a pair of optical lenses according to the disclosure comprises at least one input. The at least one input corresponds to an element of the device adapted to obtain information and to communicate the obtained information to other elements of the device such as a processor. In the sense of the disclosure, the term "obtaining" encompasses the terms "receiving" and "retrieving".

The at least one input is adapted to obtain optical lens data. The optical lens data represent the optical features of each optical lenses of the pair of optical lenses.

The at least one input is adapted to obtain wearing data representative of the wearing conditions and to obtain fitting data representative of the fitting parameters of each optical lenses.

The at least one input is adapted to obtain a specific threshold value for a binocular optical performance criterion.

The binocular optical performance criterion may comprise binocular acuity.

The binocular acuity performance criterion may correspond to a binocular acuity loss value which corresponds to the maximum value of binocular acuity loss acceptable for a given distance.

The binocular acuity loss, referred as BACU_P, is defined as a function of the relative acuity at a given point of the object space (α, β, ProxO), according to following equation:

$$BACU\_P(\alpha,\beta,ProxO) = -\log(ACU\_Snellen\_Bino),$$

where "log" is the logarithm in base 10.

$$ACU\_Snellen\_Bino = (ACU\_Snellen\_Right^{7.3} + ACU\_Snellen\_Left^{7.3})^{(1/7.3)};$$

$$ACU\_Snellen\_Left = 10^{(-ACU\_P\_Left)};$$

$$ACU\_Snellen\_Right = 10^{(-ACU\_P\_Right)};$$

where ACU_P_Left and ACU_P_Right are the monocular acuity losses, in log MAR, of the left and right eyes respectively, computed as described earlier.

The binocular optical performance criterion may comprise the difference of prismatic deviations.

The prismatic deviation in central vision is defined in the object space by the angular deviation of a ray issued from the center of rotation of the eye introduced by the quantity of prism of the lens. The prismatic deviation in peripheral vision is the angular deviation of a ray issued from the center of the entrance pupil introduced by the quantity of prism of the lens.

The prismatic deviation may refer to the vertical prismatic deviation which is defined in the object space by the angular deviation in a vertical plan of a ray, to the horizontal prismatic deviation which is the angular deviation in a horizontal plan of a ray, and/or to the total prismatic deviation which comprises the vertical and horizontal prismatic deviation.

The device for determining a binocular head freedom area of a pair of optical lenses according to the disclosure further comprises at least one processor. The at least one processor is able to communicate with the at least one input.

The at least one processor is configured for determining the binocular head freedom area of a pair of optical lenses adapted for a wearer.

The binocular head freedom area corresponds to the head positions of the wearer that provide binocular optical performances greater than or equal to a specific threshold value when the wearer is wearing the pair of optical lenses in given wearing conditions upon given fitting parameters and looking at a specific point in the scene through the pair of optical lenses.

For a specific point in the scene, a plurality of head positions of the wearer associated with a gaze direction of the wearer looking at said specific point in the scene may be defined. The binocular optical performance is determined for each of the plurality of positions of the head of the wearer associated with a gaze direction while the wearer is looking at the specific point in the scene through the pair of optical lenses. The determined binocular optical performances are then compared to the specific threshold value for said binocular optical performance criterion. Each position of the head of the wearer fixing the specific point in the scene through the optical lens for which the determined binocular optical performance is greater than or equal to the specific threshold value define the head freedom area.

Advantageously, determining the binocular head freedom area of a pair of optical lenses allows evaluating if an optical equipment comprising the pair of optical lenses is adapted for a wearer.

The at least one processor may further be configured for determining display data to be sent to a terminal so as to provide a graphical representation of the head freedom area and/or the binocular head freedom area.

The graphical representation of the head freedom area may for example correspond to a modeled 3D representation of the head freedom area. Alternatively, the graphical representation of the head freedom area may correspond to a modeled 3D representation of the measured optical performance for each position of the head of the wearer.

In another aspect, the disclosure relates to a method implemented by computer means for determining an optical lens adapted for a wearer.

The method according to the disclosure comprises determining the optical features of the optical lens considering the head freedom area of the wearer looking at a specific point through the optical lens.

In a further aspect, the disclosure relates to a computer program product comprising one or more stored sequences of instructions. The one or more stored sequences of instructions are accessible to a processor.

When executed by the processor, the one or more stored sequences of instruction causes the processor to carry out the step of obtaining optical lens data representing the optical features of an optical lens.

When executed by the processor, the one or more stored sequences of instruction causes the processor to carry out the step of obtaining wearing data representative of the wearing conditions and fitting data representative of the fitting parameters of the optical lens.

When executed by the processor, the one or more stored sequences of instruction causes the processor to carry out the step of obtaining a specific threshold value for an optical performance criterion.

When executed by the processor, the one or more stored sequences of instruction causes the processor to carry out the step of determining the head freedom area.

Alternatively, the disclosure relates to a computer program product comprising one or more stored sequences of instructions. The one or more stored sequences of instructions are accessible to a processor.

When executed by the processor, the one or more stored sequences of instruction causes the processor to carry out the step of obtaining optical lens data representing the optical features of each optical lenses of a pair of optical lenses.

When executed by the processor, the one or more stored sequences of instruction further causes the processor to carry out the step of obtaining wearing data representative of the wearing conditions and fitting data representative of the fitting parameters of both of the optical lenses of a pair of optical lenses.

When executed by the processor, the one or more stored sequences of instruction causes the processor to carry out the step of obtaining a specific threshold value for a binocular optical performance criterion.

When executed by the processor, the one or more stored sequences of instruction causes the processor to carry out the step of determining the binocular head freedom area.

The disclosure further relates to a method implemented by computer means for determining a head freedom area of an optical lens adapted for a wearer looking at a specific point in a scene through the optical lens.

The method comprises at least the step S2 of obtaining optical lens data representing the optical features of the optical lens.

The method further comprises at least the step S4 of obtaining wearing data and fitting parameters representing the wearing conditions and fitting parameters of the optical lens.

The method further comprises at least the step S6 of obtaining a specific threshold value for an optical performance criterion.

The method further comprises at least the step S8 of determining the head freedom area that corresponds to the head positions of the wearer that provide optical performances greater than or equal to the specific threshold value when the wearer is wearing the optical lens in given wearing conditions upon given fitting parameters and looking at the specific point in the scene through the optical lens.

Alternatively, the disclosure relates to a method implemented by computer means for determining a binocular head freedom area of a pair of optical lenses adapted for a wearer looking at a specific point in a scene through the optical lenses of the pair of optical lenses.

The method comprises at least the step S12 of obtaining optical lens data representing the optical features of both of the optical lenses of the pair.

The method further comprises at least the step S14 of obtaining wearing data and fitting parameters representing the wearing conditions and fitting parameters of both of the optical lenses of the pair.

The method further comprises at least the step S16 of obtaining a specific threshold value for a binocular optical performance criterion.

The method further comprises at least the step S18 of determining the binocular head freedom area that corresponds to the head positions of the wearer that provide binocular optical performances greater than or equal to the specific threshold value when the wearer is wearing the pair of optical lenses in given wearing conditions upon given fitting parameters and looking at the specific point in the scene through both optical lenses of the pair of optical lenses.

The disclosure further relates to a method, for example implemented by computer means, for determining an optical lens adapted for a wearer. In the sense of the disclosure, the term "determining" encompasses the terms "calculating", "selecting" and "optimizing".

The method for determining an optical lens adapted for a wearer comprises a step of determining optical features of the lens considering the head freedom area of the wearer looking at a specific point in a scene through the optical lens.

The disclosure has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A device for determining a head freedom area of an optical lens adapted for a wearer looking at a specific point in a scene through the optical lens, comprising:
   at least one input adapted to:
      obtain optical lens data representing optical features of an optical lens,
      obtain wearing data and fitting data representative of wearing conditions and fitting parameters of the optical lens, and
      obtain a specific threshold value for an optical performance criterion; and
   at least one processor configured to:
   determine the head freedom area that corresponds to head positions of the wearer that provide optical performances greater than or equal to the specific threshold value when the wearer is wearing the optical lens in given wearing conditions upon given fitting parameters and looking at the specific point in the scene through the optical lens.

2. The device according to claim 1, wherein the optical lens data comprise at least data representative of a geometry of front and back surfaces of the optical lens, a relative position of said front and back surfaces and an index of refraction of the optical lens.

3. The device according to claim 1, wherein the optical performance criterion comprises an acuity performance criterion.

4. The device according to claim 1, wherein the optical performance criterion comprises an optical power criterion.

5. The device according to claim 1, wherein the optical performance criterion comprises an unwanted astigmatism criterion.

6. The device according to claim 1, wherein the head positions of the wearer are defined by at least a head rotation angle.

7. The device according to claim 1, wherein the head positions of the wearer are determined around a head position of reference.

8. The device according to claim 1, wherein the head freedom area corresponds to the head positions that further require an effort for the wearer lower than or equal to an effort threshold value when the wearer is wearing the optical lens in the given wearing conditions upon given fitting parameters and looking at the specific point in the scene through the optical lens.

9. The device according to claim 1, wherein at least one input is adapted to obtain different specific threshold and the at least one processor is configured to determine the head freedom area for different visual tasks requiring the wearer to look at different specific points in the scene.

10. The device according to claim 1, wherein the specific point is a fixed point disposed a predetermined distance in front of the optical lens.

11. The device according to claim 10, wherein the head positions of the wearer that provide optical performances represent different head positions of the wearer while the wearer continues to look at the fixed point in the scene.

12. A device for determining a binocular head freedom area of a pair of optical lenses adapted for a wearer looking at a specific point in a scene through the pair of optical lenses, comprising:
   at least one input adapted to:
      obtain optical lens data representing optical features of each optical lens,
      obtain wearing data and fitting data representative of wearing conditions and fitting parameters of each optical lens, and
      obtain a specific threshold value for a binocular optical performance criterion; and
   at least one processor configured to:
   determine the binocular head freedom area that corresponds to head positions of the wearer that provide binocular optical performances greater than or equal to the specific threshold value when the wearer is wearing the pair of optical lenses in given wearing conditions upon given fitting parameters and looking at the specific point in the scene through the pair optical lens.

13. The device according to claim 12, wherein the binocular optical performance criterion comprises binocular acuity and/or difference of prismatic deviations.

14. The device according to claim 12, wherein the at least one processor is further configured to determine display data to be sent to a terminal to provide a graphical representation of the head freedom area.

15. A method implemented by a computer for determining an optical lens adapted for a wearer comprising:
   determining optical features of the optical lens considering a head freedom area of the wearer looking at a specific point in a scene through the optical lens.

16. A non-transitory computer readable medium having stored thereon a computer program product comprising one or more stored sequences of instructions that are accessible to a processor and which, when executed by the processor, causes the processor to implement a method comprising:

obtaining optical lens data representing optical features of an optical lens;

obtaining wearing data and fitting data representative of wearing conditions and fitting parameters of the optical lens;

obtaining a specific threshold value for an optical performance criterion; and determining a head freedom area that corresponds to head positions of a wearer that provide optical performances greater than or equal to the specific threshold value when the wearer is wearing the optical lens in given wearing conditions upon given fitting parameters and looking at a specific point in a scene through the optical lens.

17. A method implemented by a computer for determining a head freedom area of an optical lens adapted for a wearer looking at a specific point in a scene through the optical lens, the method comprising:

obtaining optical lens data representing optical features of the optical lens;

obtaining wearing data and fitting data representative of wearing conditions and fitting parameters of the optical lens;

obtaining a specific threshold value for an optical performance criterion; and determining the head freedom area that corresponds to head positions of the wearer that provide optical performances greater than or equal to the specific threshold value when the wearer is wearing the optical lens in given wearing conditions upon given fitting parameters and looking at the specific point in the scene through the optical lens.

* * * * *